July 1, 1930.  J. J. STEHLING  1,769,655
REVOLVING SCREEN AND CONVEYER
Filed Nov. 10, 1927  2 Sheets-Sheet 1
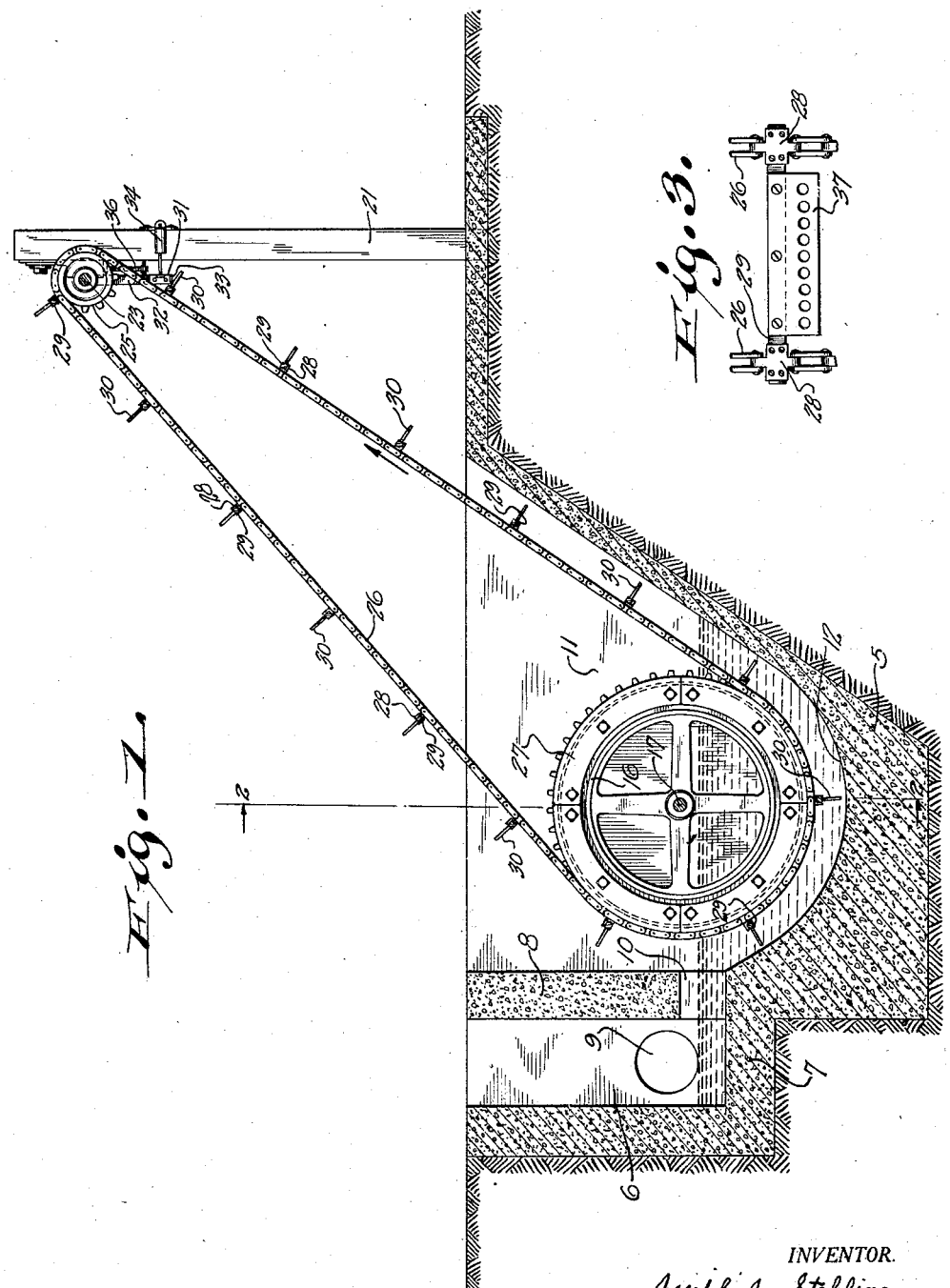
INVENTOR.
Joseph J. Stehling,
BY Morsell, Keeney & Morsell
ATTORNEYS

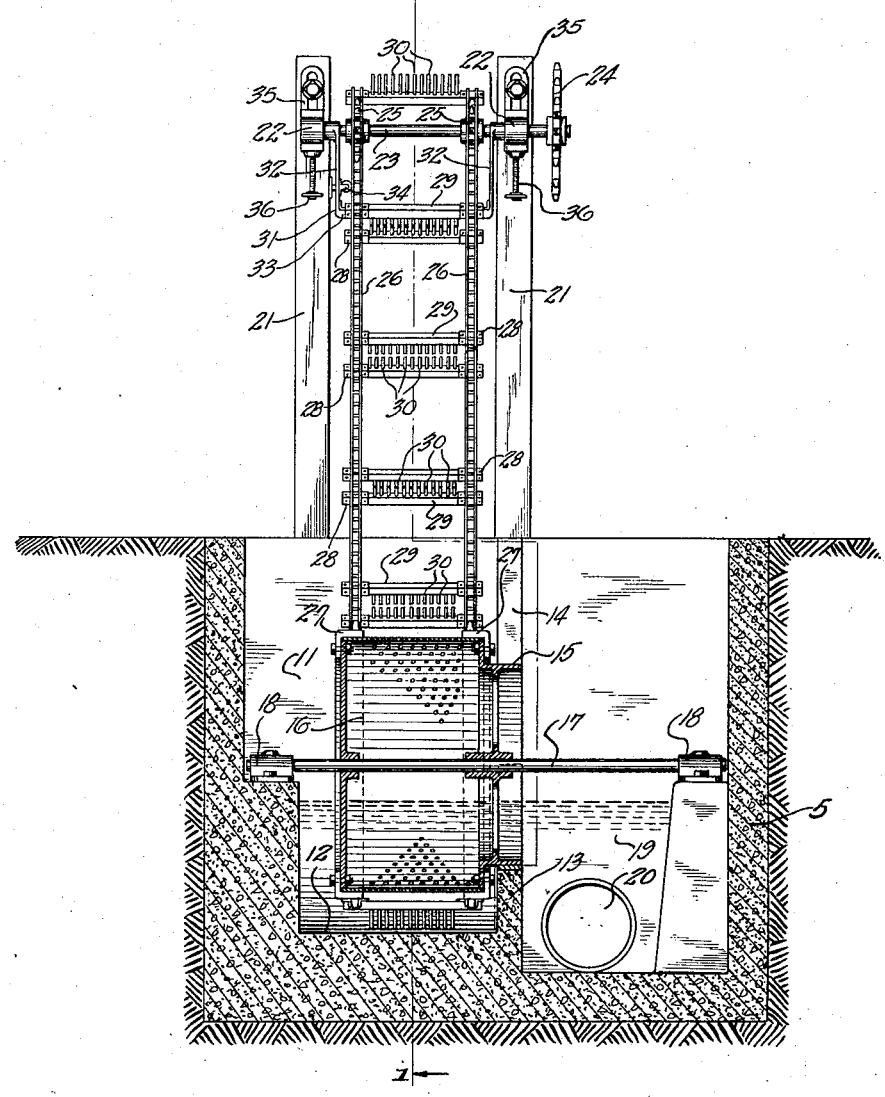

Patented July 1, 1930

1,769,655

UNITED STATES PATENT OFFICE

JOSEPH J. STEHLING, OF MILWAUKEE, WISCONSIN, ASSIGNOR TO CHAS. H. STEHLING CO., OF MILWAUKEE, WISCONSIN, A CORPORATION OF WISCONSIN

REVOLVING SCREEN AND CONVEYER

Application filed November 10, 1927. Serial No. 232,350.

This invention relates to improvements in revolving screens and conveyers, particularly adapted for use in connection with the disposal of sewage from tanneries and the like.

The sewage from tanneries contains large amounts of solid animal matter, as flesh, skin, hair, etc., and as laws prevent the disposal of such matter with the sewage, means must be provided for removing from the liquid sewage the solid matter referred to before the liquid sewage passes from the building into the municipal system.

It is, therefore, the primary object of the present invention to provide a sewage screen and conveyer which will eliminate the solid matter from the liquid sewage.

A further object of the invention is to provide a sewage screen and conveyer which will remove solid matter from liquid sewage and convey it to a desired position for convenient handling.

A further object of the invention is to provide a device of the class described having means for automatically cleaning the conveyer and keeping it free of tenacious solid matter, beyond the point where the load is delivered.

A further object of the invention is to provide a revolving screen and conveyer having a very simple drive arrangement.

A further object of the invention is to provide a device of the class described in which the conveyer extends around and serves as the driving means for the screen.

A further object of the invention is to provide a revolving screen and conveyer which is of very simple construction, is strong and durable, is efficient in operation, and is well adapted for the purposes described.

With the above and other objects in view, the invention consists of the improved revolving screen and conveyer, and its parts and combinations as set forth in the claims, and all equivalents thereof.

In the accompanying drawing, in which the same reference characters indicate the same parts in all of the views:

Fig. 1 is a longitudinal sectional view through a drainage pit, with the improved revolving screen and conveyer mounted therein, the view being indicated on the line 1—1 of Fig. 2;

Fig. 2 is a cross-sectional view of the same indicated on line 2—2 of Fig. 1; and Fig. 3 is an enlarged detail view of a slightly modified form of bucket or lifting members for use on the conveyer.

Referring now more particularly to the drawings, it will appear that the numeral 5 indicates a waste or sewage disposal pit, such as is common in tanneries and the like for the drainage.

The pit is preferably formed of concrete and one end portion thereof has a comparatively shallow compartment 6 defined by a raised bottom portion 7 and a vertical partition 8, as shown in Fig. 1. One of the walls of the pit, adjacent the compartment 6, is provided with an opening 9 at a predetermined distance above the bottom 6, and said opening allows an inflow of sewage through suitable pipes. The partition 8 is formed with a lower opening 10 communicating with a large compartment 11 of the pit, said latter compartment having a curved bottom portion 12. The compartment 11 is divided longitudinally by a partition 13 formed with a U-shaped slotted opening 14 in which is removably disposed the bearing ring 15 of a revoluble screen 16. The screen 16 is mounted fast on a shaft 17 which is journaled at its end portions in bearings 18 mounted in the pit. The screen is so positioned that the sewage must pass therethrough to flow into an adjacent pit outlet chamber 19, which is separated from the large compartment 11 by the partition 13. Hence, the solid matter will be screened, and only clear liquid will enter the chamber 19 and will be discharged therefrom through an outlet opening 20.

Obviously, solid matter will accumulate within the pit compartment 11, and an important feature of the invention resides in the means employed for removing the solid matter from said compartment. For that purpose, an endless conveyer is utilized having its lower end portion within the pit compartment 11, and extending upwardly and outwardly of the pit.

The conveyer comprises a pair of supporting members 21 mounted above and rearwardly of the pit, and carrying bearing members 22 at their upper end portions in which is journaled a transverse shaft 23. Said shaft is driven by a sprocket wheel 24 mounted on its end portion and adapted to carry a chain drive (not shown). Also mounted fast on said shaft 23, inwardly of the supporting members 21, are a pair of spaced smaller sprocket wheels 25 over which a pair of elongated endless chains 26 extend. As shown, the revolving screen 16 has bolted to its outer surface a pair of spaced annular sprocket or toothed members 27, and the lower end portions of said chains 26 extend over and engage said sprocket members 27, this arrangement serving the double function of operatively holding said chains within the pit, and also serving as the driving or revolving means for the screen. At spaced intervals, the pair of chains 26 are formed with opposed angle plates 28, and to each pair of opposed angle plates the end portions of a transverse bar 29 are secured. Each bar is provided with a row of outwardly projecting fingers or pegs 30, and the rows of pegs, together with the bars on which they are mounted, form conveyer bucket or lifting elements.

The conveyer is further equipped with a bucket or lifting member cleaning or scraping member, designated generally by the numeral 31. As shown in Fig. 2, said member comprises a pair of spaced arms 32 having their inner ends mounted loosely on the shaft 23 outwardly of the small sprocket wheels 25. The outer end portions of said arms are joined by a transverse scraping bar 33. Normally, the cleaning member 31 hangs in the position shown in Fig. 1, but is adapted to move toward the right in said view against an air check 34, of any commercial form, said air check providing for a slow easy return of the cleaning member to normal position. The conveyer is adapted to travel in the direction indicated by the arrow in Fig. 1, and each row of pegs will engage the scraping bar 33 and cause the scraping member to move outwardly pivotally along said pegs, cleaning the same, until it drops over the ends of the pegs and returns to normal position for engagement with the next row of pegs.

It is to be observed that the bearings 22 for the shaft 23 are adjustably mounted in slotted members 35 and are retained in adjusted position by turn screws 36. By this arrangement, said bearings may be moved to take up slack in the conveyer.

In Fig. 3 is illustrated a slightly modified form of bucket or lifting member for the conveyer, wherein an apertured plate 37 secured to the bar 29 is substituted for pegs.

In operation the sewage is screened as described, and the conveyer operates in the pit compartment 11 to drive the screen and also to remove and elevate solid material from said compartment. The material is elevated by said bucket or lifting members to a point above and rearwardly of the pit where it is removed by the scraping member and permitted to drop to a convenient position for removal and disposal.

From the foregoing description, it will be seen that the improved revolving screen and conveyer is of very simple and novel construction, and is well adapted for the purpose described.

What is claimed as the invention is:

1. The combination with a pit, of a revoluble drum-like screen therein, a conveyer extending into the pit and surrounding the screen to drive it, said conveyer also serving to remove substantial amounts of material from the pit, and means connected with the outer end portion of the conveyer for automatically freeing the same of material.

2. The combination with a pit, a revoluble screen therein, a conveyer extending into the pit and having a direct driving engagement with the screen and adapted to remove substantial amounts of solid material from the pit, and a cleaning member pivotally mounted adjacent the outer end portion of the conveyer remote from the screen and moved by contact with the conveyer for cleaning operations.

3. The combination with a pit, of a revoluble screen therein, an elevator member extending into the pit and having a direct driving engagement with the screen, a plurality of lifting members carried by the elevator for removing substantial amounts of solid matter from said pit, and means adjacent an outer portion of said elevator for automatically cleaning said lifting members exteriorly of the pit.

4. The combination with a pit having a screening chamber and an outlet chamber, of a revoluble screen within said screening chamber, an endless elevator member extending into said screening chamber and about said screen to drive the same, a plurality of outwardly projecting lifting members carried by said elevator member for removing substantial amounts of solid material from said screening chamber, and a scraping member pivotally mounted adjacent an exterior portion of the elevator member and having a transverse blade underlying a portion of the elevator member for scraping engagement with said lifting members.

5. The combination with a drainage pit, of a revoluble screen and conveyer, comprising a revoluble drum-like screen within the pit, a pair of annular toothed members carried by said screen, a pair of endless chains extending about and engaging said toothed members and extending upwardly and outwardly of the pit, a plurality of spaced transverse lifting members connecting said chains, a support exteriorly of the pit and adapted to convey substantial amounts of solid material from the pit, a driven shaft revolubly carried thereby, a pair of spaced sprocket wheels mounted on said shaft, the outer end portions of said chains being extended over said sprocket wheels, and a depending scraping member pivotally mounted on said shaft and having a transverse blade portion for scraping engagement with said lifting members.

In testimony whereof, I affix my signature.

JOSEPH J. STEHLING.